United States Patent [19]

Shoji et al.

[11] 4,154,777

[45] May 15, 1979

[54] PROCESS FOR PRODUCING HIGH IMPACT AND WEATHER RESISTANT GRAFT COPOLYMERS

[75] Inventors: Fusaji Shoji, Mito; Susumu Era; Hisashi Kogame, both of Hitachi; Tatsuo Ito; Koichi Kakefuda, both of Ichihara; Kiyoyuki Suzue, Chiba, all of Japan

[73] Assignee: Hitachi Chemical Company, Ltd., Japan

[21] Appl. No.: 828,093

[22] Filed: Aug. 26, 1977

[30] Foreign Application Priority Data

Aug. 27, 1976 [JP] Japan .................................. 51-102348
Apr. 30, 1977 [JP] Japan .................................. 51-50281

[51] Int. Cl.$^2$ ............................................. C08F 255/04
[52] U.S. Cl. ............................ 260/878 R; 260/880 R
[58] Field of Search ...................... 260/878 R, 880 R

[56] References Cited

U.S. PATENT DOCUMENTS

| | | | |
|---|---|---|---|
| 3,671,607 | 6/1972 | Lee ....................................... | 260/878 R |
| 3,855,355 | 12/1974 | Moore .................................. | 260/880 R |
| 3,900,529 | 8/1975 | Beer ..................................... | 260/880 R |
| 3,927,142 | 12/1975 | Strobel ................................ | 260/878 R |
| 3,939,225 | 2/1976 | Hall ..................................... | 260/880 R |
| 4,012,462 | 3/1977 | Chaudhary ......................... | 260/878 R |

FOREIGN PATENT DOCUMENTS 1373089  11/1974  United Kingdom.

*Primary Examiner*—Paul R. Michl
*Attorney, Agent, or Firm*—Craig & Antonelli

[57] ABSTRACT

High impact and weather resistant graft copolymers are produced by a two-stage process comprising (I) carrying out bulk or suspension polymerization of a mixture obtained by impregnating a substantially non-polar rubber-like polymer having iodine value of 2 to 40 with a mixture of an aromatic vinyl compound and a polar vinyl compound in the presence of a polymerization initiator to yield a graft copolymer, and (II) subjecting a mixture obtained by dispersing with partly dissolving (or impregnating) the graft copolymer in (or with) a mixture of an aromatic vinyl compound and a polar vinyl compound to bulk, suspension or bulk-suspension polymerization in the presence of a polymerization initiator.

27 Claims, No Drawings

PROCESS FOR PRODUCING HIGH IMPACT AND WEATHER RESISTANT GRAFT COPOLYMERS

BACKGROUND OF THE INVENTION

This invention relates to a process for producing high impact and weather resistant graft copolymers, and more particularly it relates to a method of producing graft copolymers with excellent impact and weather resistance according to a two-stage process by graft copolymerizing a rubber-like polymer such as ethylene-propylene copolymer rubber, ethylene-propylene-non-conjugated-diene copolymer rubber or butyl rubber with an aromatic vinyl monomer and a polar vinyl monomer copolymerizable therewith.

Three-component graft copolymer resins obtained from copolymerization of aliphatic vinyl monomers, diene rubber and aromatic vinyl monomers, such as for example acrylonitrile-butadiene-styrene terpolymer resin popularly called as ABS resin, are widely used as thermoplastic resins with excellent impact resistance. However, since this kind of resins contain as a molecular constituent a rubber component having carbon-carbon double bonds such as polybutadiene rubber or styrene-butadiene copolymer rubber, they have the vital defect in that they are very susceptible to oxygen, ozone or ultraviolet rays and hence if they are left exposed in the air, particularly in the outdoors, they are bound to suffer excessive deterioration of mechanical properties such as impact strength and elongation as well as development of cracks on the surface or coloring. In order to overcome such a defect, the use of rubber having almost no double bond, such as acrylic rubber, ethylene-vinyl acetate copolymer rubber, chlorinated polyethylene or ethylene-propylene rubber, instead of diene rubber has been proposed, and to this end, graft copolymer resins made of acrylonitrile, styrene and rubber copolymers have been produced by various polymerization methods such as emulsion polymerization, bulk-suspension polymerization and solution polymerization.

An ethylene-propylene type rubber is insoluble in a polar vinyl monomer such as acrylonitrile, and hence such a rubber will not be dissolved in a mixture of aromatic vinyl and polar vinyl compounds, for example, a mixture of styrene and acrylonitrile, and is only partly swollen even under a high temperature condition. Therefore, the above-said type of graft polymerization has been considered hardly attainable without using an organic solvent for dissolving ethylene-propylene rubber.

There are known methods for producing graft copolymers by using ethylene-propylene rubber as rubber component, as for instance proposed in U.S. Pat. Nos. 3,538,191 and 3,538,190 and Japanese Patent Application Kokoku (Post-Exam Publn) Nos. 32585/1973 and 14874/1974. However, any of these methods is a one-stage process and uses an organic solvent for dissolving ethylenepropylene rubber, so that these methods, although capable of producing graft copolymers with high impact strength, involve troublesome steps for removal and refining of the solvent from the produced resin, and also such steps have possibility of causing coloring of the produced resin.

U.S. Pat. Nos. 3,642,950 and 3,819,765 disclose a graft copolymer producing method according to a two-stage process in which solution polymerization is performed at the first stage, but this method also has the similar problem because of the use of a solvent in the first stage, and the obtained graft copolymers are merely of the same degree of impact strength as the products obtained from the one-stage solution polymerization.

As a method for producing aromatic vinyl compound-ethylene-propylene rubber-polar vinyl compound graft copolymers without using any organic solvent, there has been proposed a technique comprising the steps of dispersing ethylene-propylene rubber in an aqueous medium by using an emulsifier to form a rubber latex and then graft polymerizing the vinyl monomer (Japanese Patent Application Kokoku (Post-Exam Publn) No. 14549/1974). According to such an emulsion polymerization method, however, it is hard to obtain a stable rubber latex and even if a graft polymer could be obtained, such a polymer is low in impact resistance. There is also known a method in which vinyl monomers such as styrene and acrylonitrile are grafted onto ethylene-propylene rubber by way of bulk-suspension polymerization by using a styrene-acrylonitrile copolymer as dispersant (U.S. Pat. No. 3,538,192), but the products obtained from this method are also low in impact strength. It was thus impossible with any of the known methods using no solvent to obtain the graft copolymers having satisfactory impact strength.

There is further known a method in which a styrene-acrylonitrile copolymer is blended with a graft copolymer obtained by grafting styrene, acrylonitrile or the like onto a rubber-like polymer (U.S. Pat. Nos. 3,489,821 and 3,489,822), but the products from this method are also poor in impact resistance.

SUMMARY OF THE INVENTION

This invention is intended to solve these problems of the conventional methods, and it concerns a process for producing high impact and weather resistant graft copolymers without using any organic solvent.

More definitely, this invention provides a process for producing high impact and weather resistant graft copolymers comprising the following steps:

(I) a mixture obtained by impregnating (A) 30 to 90% by weight of a substantially non-polar rubber-like polymer having iodine value of 2 to 40 with (B) 70 to 10% by weight of a vinyl compound mixture composed of (B-1) 40 to 90% by weight of an aromatic vinyl compound and (B-2) 60 to 10% by weight of a polar vinyl compound, is subjected to bulk or suspension polymerization in the presence of (C) a polymerization initiator, to thereby produce a graft copolymer; and then (II) the mixture obtained by dispersing (or dissolving)

(D) the graft copolymer obtained in the above-said step (I) in (E) a vinyl compound mixture composed of (E-1) 40 to 90% by weight of an aromatic vinyl compound and (E-2) 60 to 10% by weight of a polar vinyl compound, or by impregnating the component (D) with the component (E) so that the rubber-like polymer content in the mixture becomes 5 to 30% by weight, is subjected to bulk polymerization, suspension polymerization or bulk-suspension polymerization in the presence of (F) a polymerization initiator.

DETAILED DESCRIPTION OF THE INVENTION

The bulk polymerization practiced in the first stage of the process of this invention is slightly different from the type commonly employed for production of ABS resin, high impact polystyrene and the like. It is of common practice to carry out bulk polymerization in a system prepared by dissolving a rubber-like polymer in a vinyl compound mixture, but in the process of this invention, it suffices to impregnate the rubber-like polymer with the vinyl compounds, and it is not essential to dissolve the polymer in the vinyl compound mixture. Rather, in the case of this invention, it is found difficult to let the rubber-like polymer dissolve in the mixture of vinyl compounds such as aromatic vinyl compound and polar vinyl compound.

Also, suspension polymerization is usually accomplished by dissolving a rubber-like polymer in a monomer or monomers and suspending the mixture in an aqueous medium, but in the process of this invention, such suspension polymerization is practiced by suspending in an aqueous medium a mixture obtained by impregnating a rubber-like polymer with vinyl compounds and swelling the same. Use of a suspending agent in the aqueous medium can prevent the rubber from adhesion. In case of performing polymerization in an aqueous medium, it is necessary to separate the graft copolymer (obtained in the form of fine pieces or beads) from the aqueous medium, but it is not an essential requirement in this invention to perfectly dry the product; the product may contain moisture of such a degree as will not exert any adverse effect to the step of the second stage. In case of dispersing (or dissolving) the graft copolymer (component (D)) in the vinyl compound mixture (component (E)) in the second stage, an allowable water content in the graft copolymer (component (D)) is 70% by weight or less, preferably 50% by weight or less based on the weight of said graft copolymer.

The graft polymerization reaction in the first stage is practiced until the vinyl compounds are substantially perfectly polymerized, but in certain cases, such a polymerization reaction may be stopped at a stage where the conversion becomes 50 to 90% by weight.

Although the rubber-like polymer used in this invention is not subject to any specific restrictions in its form, it is desirable to use such a polymer in the finely divided form, that is, in the form of small pieces, grains or pellets, so as to facilitate impregnation of said polymer in the vinyl compound mixture.

The impregnation may be accomplished by immersing the rubber-like polymer in the mixture of vinyl compounds. The rubber-like polymer used in this invention is not dissolved or is hardly dissolved in the mixture of vinyl compounds, that is, the mixture of an aromatic vinyl compound and a polar vinyl compound, wherein the polar vinyl compound content is 2% by weight or more, and hence the rubber-like polymer merely swells by absorbing the vinyl compounds.

In effecting immersion, it is not always necessary to use a mixture of said vinyl compounds; the polymer may be immersed first in the aromatic vinyl compound and then in the polar vinyl compound.

For impregnating the rubber-like polymer with the vinyl compounds, both polymer and vinyl compounds may be suspended in water. In this case, the order of addition of the vinyl compounds is free to choose.

In the stage (I) of this invention, it is desirable that the component (A), i.e. the rubber-like polymer, is ground mechanically in the presence of the vinyl compounds. Preferably, such mechanical grinding is performed after a part or whole of the vinyl compounds has been impregnated into the rubber-like polymer. It is to be noted that such mechanical grinding may be practiced in the presence of water.

There is no specific limitation on the method of mechanical grinding. For instance, in case of grinding the rubber-like polymer in the presence of the vinyl compounds or an aqueous medium, it is recommended to use a crusher, for example a convectional high mixer (such as T.K. HOMOMIXER or T.K. PIPELINE HOMOMIXER) to grind the polymer into fine pieces of less than about 5 mm in particle diameter. In other cases, for instance when the rubber-like polymer alone is ground previously, there may be employed any ordinary type of crusher which is capable of grinding the material into fine pieces of less than about 5 mm. Thus, the polymer material is ground into the grain size of less than about 5 mm for allowing good dispersion of the material in the graft copolymer, but it is usually desirable that such grain size is 3.5 mm or less, most preferably 2 mm or less.

In the stage (II) of this invention, the graft copolymer (component (D)) obtained in the stage (I) is further graft copolymerized with the vinyl compounds by means of bulk polymerization, bulk-suspension polymerization or suspension polymerization without using any organic solvent. It suffices here to form a turbid solution by collapsing the original form of the graft copolymer (component (D)). In this case, the graft copolymer (component (D)) is not perfectly dissolved, that is, only a part thereof is dissolved, with the remainder being dispersed. Therefore, strictly speaking, it should be considered that the graft copolymer is dispersed with partly dissolved in the vinyl compounds. Accordingly, the ensuing step of polymerization is slightly different in nature from the conventional process. That is, it is not that the perfectly dissolved mixture is polymerized, but the mixture of vinyl compounds having dispersed with partly dissolved therein the graft copolymer (component (D)) is subjected to bulk, bulk-suspension or suspension polymerization. For facilitating dispersion with partial solution of the graft copolymer (component (D)), it is desirable to use the graft copolymer in the finely ground form or in the form of small beads.

Such dispersion with partial solution may be accomplished by first dissolving the graft copolymer (component (D)) in a vinyl compound mixture consisting of 100 to 85% by weight of an aromatic vinyl compound and 0 to 15% by weight of a polar vinyl compound, and then adding thereto the remaining portion of the vinyl compounds. This operation is carried out at a temperature of 70° C. or lower, preferably at 30° to 60° C., and more preferably under agitation or kneading by a kneader.

Alternatively, the vinyl compounds are first impregnated into the graft copolymer (component (D)) and then polymerized.

Said impregnation may be accomplished by any suitable method, for example, by immersing the graft copolymer (component (D)) in the mixture of the aromatic and polar vinyl compounds, or by first immersing the graft copolymer in an aromatic vinyl compound and then further immersing said polymer in a polar vinyl compound. It is also possible to suspend the graft copolymer (component (D)) and the vinyl compounds in an aqueous medium in the presence of a suspending agent, allowing said copolymer to absorb the vinyl compounds. In these cases, the graft copolymer (component (D)) is swollen by the vinyl compounds. It is desirable that the degree of swelling is sufficiently high. In short, what is important is that the graft copolymer (component (D)) is impregnated with the vinyl compounds, in other words, the vinyl compounds (component (E)) penetrate into the graft copolymer (component (D)) and the latter is swollen so that said copolymer stays in a solid form in external appearance. As far as this requirement is met, any impregnation method may be used.

No specific restriction is placed on the time of addition of the polymerization initiator in the step of impregnation but it is desirable to add the polymerization initiator after the graft copolymer has been impregnated with the vinyl compounds, or to dissolve the polymerization initiator in the mixture of the vinyl compounds before impregnation. As for the temperature during the impregnation operation, it is also not subject to any particular restriction but it must be lower than the temperature at which half-life of the polymerization initiator is 10 hours.

A most preferred method of impregnation is, for example, to suspend the graft copolymer (component (D)) obtained in the step (I) and the vinyl compounds (component (E)) in an aqueous medium in an amount of at least ½ (by weight) of the total weight of the graft copolymer and the vinyl compound mixture.

The condition provided from impregnating the graft copolymer with the vinyl compounds is evidently distinguished from the case where the graft copolymer is dispersed with partial dissolved in the vinyl compound mixture to form a viscous and apparently turbid solution (in this case the graft copolymer is of course out of shape).

Preferably, the graft copolymer (component (D)) is ground mechanically. Such mechanical grinding of the graft copolymer facilitates dispersion (or dissolving) of said copolymer in the vinyl compound mixture and also impregnation of said copolymer with said mixture.

It is most preferred to effectuate such mechanial grinding while impregnating the graft copolymer (component (D)) with the vinyl compounds in the presence of water, or to accomplish said mechanical grinding in the presence of water after said graft copolymer has been impregnated with the vinyl compounds in the presence or absence of water. Graft polymerization of such mechanically ground and vinyl compound-impregnated copolymer can produce the end product graft copolymer with excellent impact resistance. This mechanical grinding may be performed in the absence of water after impregnation of the graft copolymer (component (D)) with the vinyl compounds, but in this case there brings about a condition close to that produced from dispersion (or dissolving) of said copolymer in the vinyl compound mixture. Therefore, in case of practicing said mechanical grinding in a situation where the graft copolymer (component (D)) has been impregnated with the vinyl compounds, such grinding should be performed in the presence of water in an amount of 50% by weight or more based on the total weights of the graft copolymer (component (D)) and vinyl compounds (component (E)). If the amount of water present is less than 50% by weight, there may be produced a condition close to that of dispersion with partial solution.

Thus when the graft copolymer (component (D)) is mechanically ground in a condition where said copolymer has been impregnated with the vinyl compounds, said graft copolymer and hence the rubber-like polymer component is well dispersed in the graft copolymer obtained as end product because of small grain size, resulting in improved properties such as impact resistance of the end product.

In case of using water in the impregnation step or during said mechanical grinding, it is desirable that this operation is immediately followed by suspension polymerization.

No specific restriction is put on the method of mechanical grinding. For instance, in case of grinding said graft copolymer (component (D)) in the presence of the vinyl compounds and/or an aqueous medium, it is suggested to use a crusher like a convectional high mixer (such as T.K. Homomixer or T.K. Pipeline Homomixer) to grind the material into fine pieces with a size of about 5 mm or less, preferably about 3 mm or less. In other cases, for instance when mechanical grinding is performed previously, there may be employed any ordinary type of crusher capable of grinding the material into fine pieces of about 5 mm or less.

In case of practicing bulk polymerization in the step (I) or (II) of this invention, water is allowed to exist in an amount which will not induce suspension polymerization, for the purpose of lowering viscosity of the system.

In case of carrying out bulk-suspension polymerization in the step (II), bulk polymerization is switched to suspension polymerization by adding water and a suspending agent at the point when the conversion has reached 3 to 40%, preferably 10 to 30%. In case of using a certain kind of graft copolymer, the conversion may be outside the above-mentioned range if the polymerization material is not reduced into blocks and a stable suspension system is formed when water and the suspending agent are added. In this case, too, water may be present in the bulk polymerization step in such an amount as will not induce suspension polymerization for the prupose of reducing viscosity of the system.

When performing suspension polymerization in the step (I) or (II) in the process of this invention, it is desirable that the amount of water used for suspending the polymerizable mixture is 70% by weight or more based on the total weight of the rubber-like polymer (component (A)) and vinyl compounds (component (B)) or the graft copolymer (component (D)) and vinyl compounds (component (E)). If the amount of water used is less than 70% by weight, the graft copolymer obtained in the stage (I) and/or the object resin may be formed into blocks or large lumps, making it impossible to obtain resin with fine particles. Therefore, the operation for the after-treatment becomes troublesome.

In both stages (I) and (II) in the process of this invention, the polymerization temperature is in the range of 40° to 150° C. and the polymerization time is in the range of 3 to 24 hours.

The substantially non-polar rubber-like polymers with iodine value of 2 to 40 which are usable in this invention include ethylene-propylene type rubbers such as ethylene-propylene copolymer rubber or ethylene-propylene-non-conjugated-diene terpolymer rubber, and other rubber-like polymers like butyl rubber such as two-component system rubber obtained from isobutylene and isoprene, and such rubber-like polymers may be used either singly or in combination.

The non-conjugated diene usable as a component in said ethylene-propylene-non-conjugated-diene terpolymer rubber may be an open chain non-conjugated diene such as 1,4-pentadiene, 1,4-hexadiene, 1,5-hexadiene or 1,7-octadiene, or a cyclic non-conjugated diene such as dicyclopentadiene, ethylidene-norbornene, 1,5-cyclooctadiene or 5-methylene-2-norbornene. The ethylene/propylene weight ratio is in the range of 90/10 to 20/80. The proportion of the non-conjugated diene in said ethylene-propylene-non-conjugated-diene terpolymer rubber and the proportion of isoprene in the isobutylene-isoprene copolymer, when calculated in terms of iodine value, is preferably in the range of 2 to 40. The Mooney viscosity $ML_{1+4}$(100° C.) of the rubber used is preferably in the range of 25 to 120, more preferably 60–90. The rubber component usable in this invention is not limited to ethylene-propylene type rubber and butyl rubber; it is also possible to use a blend system consisting of an ethylene-propylene type rubber and one or more of other types of rubber such as polybutadiene rubber, styrene-butadiene rubber, acrylonitrile-butadiene rubber, polyisoprene rubber, acrylic rubber, ethylene-vinyl acetate copolymer rubber, chlorinated polyethylene rubber and natural rubber. The kind of rubber and its blend ratio in such blend system may be suitably selected depending on the purpose of use. However, in case of using a highly unsaturated rubber such as polybutadiene rubber, it is desirable that such rubber content is 50% by weight or less so as not to impair weather resistance of the product.

In practicing the process of this invention, the blend ratio of the rubber-like polymer:vinyl compound mixture used in the stage (I) should be 30–90:70–10% by weight, preferably 40–70:60–30% by weight.

In the present invention, in order to facilitate graft polymerization or crosslinking of the rubber-like polymer itself, it is advisable to prosecute a pre-treatment of rubber, such as forming the cardinal points for grafting in the rubber-like polymer or letting said polymer possess gelating structure by, for example, heating said rubber-like polymer while contacting air or oxygen therewith in the presence of a radical forming agent such as an organic peroxide, or by irradiating the polymer with electron rays, γ-rays or electromagnetic waves. Use of such pre-treated rubber-like polymer in the process of this invention brings about even higher improvement of impact strength of the produced resin.

Preferred examples of the aromatic vinyl compounds usable in this invention are styrene, vinyltoluene, vinylxylene, chlorostyrene, dichlorostyrene, α-methylstyrene, para-tertiary butylstyrene and vinylnaphthalene, but styrene is most preferred for use in this invention. In the present invention, the aromatic vinyl compounds may be used either singly or in combination, and the aromatic vinyl compounds used in the stage (I) may or may not be identical with those used in the stage (II) though it is preferred that they are identical.

The polar vinyl compounds used in this invention are those represented by the following general formula:

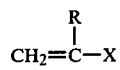

(wherein R is hydrogen or an alkyl group having 1 to 5 carbon atoms, and X is a group selected from the group consisting of —CN, —COOH, —CO$_2$R' and —CONH$_2$, wherein R' is an alkyl group having 1 to 9 carbon atoms), and such compounds include, for example, acrylonitrile, acrylic acid, methacrylic acid, methyl methacrylate, ethyl methacrylate, ethyl acrylate, butyl acrylate, butyl methacrylate and methacrylonitrile, among which acrylonitrile and methyl methacrylate are most preferred. These polar vinyl compounds may be also used either singly or in combination, and the compounds used in the stage (I) may not necessarily be the same as those used in the stage (II) though it is preferred to use the same compounds in both stages.

The ratio of the aromatic vinyl compounds:polar vinyl compounds used in this invention may be freely selected from the range of 40:60 to 90:10 (by weight ratio), and such ratio may be different between the stage (I) and the stage (II), but it is preferred to employ the same ratio in the both stages.

In practicing the process of this invention, vinyl compounds other than those mentioned above, for example, vinyl esters such as vinyl acetate, vinyl chloride, vinylpyridine, methylvinylpyridine, N-vinylcarbazole or the like may be used in combination with the above-mentioned vinyl compounds.

The cross-linking agents usable in this invention are the compounds having two or more ethylenic double bonds, for example, divinylbenzene, dimethacrylates of diethylene glycols, divinyl ethers of diethylene glycols, trially cyanurate, 1,3,5-triacryloylhexahydro-s-triazine and the like, and such compounds may be used in either stage (I) or stage (II) of this invention. Use of these compounds contributes to the improvements of the mechanical properties such as impact resistance as well as the external appearance (such as luster) of the object resin. In case of using a crosslinking agent, it is added in an amount of 0.005 to 2% by weight, preferably 0.01 to 1% by weight, based on the total weight of the vinyl compounds used.

In the present invention, each of the components of the end product, that is, ethylene-propylene rubber-like polymer, aromatic vinyl compounds and polar vinyl compounds, may be used either singly or in combination, and the proportions of each of such components may be suitably selected depending on the required performance of the object resin as specified in the Claims. For instance, an increase of the rubber-like polymer content results in bettered impact resistance, while an increase of the aromatic vinyl compound content provides a resin with excellent workability. Also, an increase of the polar vinyl compound content results in improved properties such as heat resistance and rigidity, and an increase of the polar vinyl compounds such as methyl methacrylate allows obtainment of thermoplastic resins with excellent transparency.

In consideration of these facts, it may be determined that, generally, the preferred range of proportions of the respective components of the end product is 5 to 30% by weight, more preferably 8 to 20% by weight, of rubber component to 95 to 70% by weight, more preferably 92–80% by weight of the total vinyl compounds. Also, the aromatic vinyl compounds/polar vinyl compounds ratio (by weight) is in the range of 40/60 to 90/10, preferably 60/40 to 80/20.

The polymerization initiators usable in this invention are of the oil-soluble type generally used for suspension polymerization or bulk polymerization, and the following may be cited as preferred examples of such polymerization initiators: benzoyl peroxide, 4-dichlorobenzoyl peroxide, t-butyl peroxy benzoate, t-butyl peroxyacetate, t-butyl peroxyisobutyrate, t-butyl peroxylaurate, dicumyl peroxide, t-butyl cumyl peroxide, cumene hydroperoxide and lauroyl peroxide. The symbol "t" used in above listing stands for "tertiary", and the same abbreviation will also be used in the following description.

It is also possible to use two or more different kinds of polymerization initiators in either of the stage (I) or stage (II) in the process of this invention. The amount of such polymerization initiator(s) used is not specifically defined. Usually, the object of this invention can well be attained by using such agent in an amount of 0.01 to 5.0% by weight based on the total weight (100 parts by weight) of the whole mixture. If the proportion of polymerization initiator is less than 0.01% by weight, the polymerization rate becomes too slow, while if the proportion exceeds 5.0% by weight, the polymerization rate becomes too fast, causing vigorous generation of heat, which makes the temperature control difficult. This may also invite decline of the polymerization degree of the resin and deterioration of its mechanical properties.

The suspending agent used in the first and second stages in the process of this invention may be, for example, partially saponified polyvinyl alcohol, alkyl cellulose (such as methyl cellulose, ethyl cellulose or acetyl cellulose), hydroxyalkyl cellulose (such as hydroxyethyl cellulose), polyacrylic acid, polyacrylamide, sodium polyacrylate, calcium phosphate, calcium carbonate, or magnesium phosphate. Other assistants such as anionic, cathionic or nonionic surfactants, lubricants, etc., may be also suitably selected for use in this invention.

The suspending agent is preferably used in the stage (I) in an amount of 0.1 to 5% by weight based on the total weight of the vinyl compounds and the rubber-like polymer. It is also used in the stage (II) preferably in an amount of 0.1 to 5% by weight based on the total weight of the vinyl compounds and the graft copolymer.

In the present invention, it is also possible, if so desired, to use a chain transfer agent including, for example, mercaptans such as t-dodecyl mercaptan or ethyl mercaptan, thioglycolic acids such as thiopropionic acid, carbon tetrachloride or α-methylstyrene dimers.

The end product resins of this invention may be added with known types of antioxidant, ultraviolet absorber, lubricant, stabilizer, plasticizer and the like, and if desired, these additives may be added to the polymerization system before or during polymerization.

The present invention is now described in further detail by way of preferred embodiments thereof, but these embodiments should not be construed as restrictive to the scope of the present invention.

In order to avoid confusion, the graft copolymer obtained as end product in this invention is called thermoplastic resin in the following description of the embodiments. In the following Examples, all percents are by weight unless otherwise specified.

EXAMPLE 1

(A) Polymerization in Stage (I)

256 Grams of finely divided pieces of ethylene-propylene-non-conjugated-diene terpolymer rubber (this rubber being hereinafter referred to as "EPDM rubber") (EP-57X, trade name, by Mitsubishi Petrochemical Co., Ltd., iodine value: 15; Mooney viscosity $ML_{1+4}$(100° C.): 90; diene component: ethylidene-norbornene; ethylene content: 75% by weight) was immersed in a mixed solution consisting of 192 grams of styrene, 64 grams of acrylonitrile and 2.8 grams of benzoyl peroxide at room temperature for 15 hours and then fed into a 1-liter autoclave (pressure autoclave with an induction stirrer) for additional 1-hour immersion at 50° C.

The fine pieces of EPDM rubber were swollen by the mixed solution of styrene, acrylonitrile and benzoyl peroxide, and the thus obtained mixture was polymerized at 65° C. for 5 hours and then at 75° C. for 3 hours, consequently producing a graft copolymer in the yield of 512 grams.

(B) Polymerization in Stage (II)

128 Grams of finely divided pieces of thus obtained graft polymer was immersed in a mixed solution of 390 grams of styrene and 20 mg of t-butylcatechol at room temperature for 15 hours and the mixture was fed into a 3-liter three-necked flask and heated at a temperature of lower than 70° C. to dissolve (or disperse) the fine pieces of said polymer with styrene under agitation, and then 28 grams of acrylonitrile was added dropwise thereto, continuing agitation of the mixture. Thereafter, remaining 100 grams of acrylonitrile and 5.63 grams of benzoyl peroxide were added to obtain a slightly turbid viscous solution. The viscous mixture was then suspended in a mixed solution comprising 61.5 grams of 5% aqueous solution of partially saponified polyvinyl alcohol (KH-20 by Nippon Gosei Kagaku Kogyo Co., Ltd., saponification degree: 78.5-81.5% by mole; polymerization degree: over 1,500), 61.5 grams of 1% aqueous solution of sodium polyacrylate (Aron-Vis M by Towa Gosei Kagaku Co., Ltd.) and 1,150 grams of deionized water, and the suspension polymerization was performed at 75° C. for 4 hours and at 80° C. for 2 hours. The reaction product was filtered, washed with water two to three times and then dried under heating at 80° C. to obtain the object thermoplastic resin with particle diameter of 0.2 to 3.0 mm (yield: 96%).

EXAMPLE 2

(A) Polymerization in Stage (I)

256 Grams of EPDM rubber (EP-57P by Mitsubishi Petrochemical Co., Ltd., pelletized), 192 grams of styrene, 64 grams of acrylonitrile and 2.82 grams of benzoyl peroxide were fed into a 3-liter three-necked separable flask furnished with a stirrer and a reflux cooler, and immersed overnight at room temperature. Then 120 grams of 5% aqueous solution of partially saponified polyvinyl alcohol (KH-20 ) and 670 grams of deionized water were further supplied into the flask under agitation. This mixed solution was heated at 75° C. for 5.5 hours and further at 95° C. for 3 hours, and the obtained graft polymer beads were filtered, washed with water and then dried at 80° C. The yield of the thus obtained graft polymer was 492 grams.

(B) Polymerization in Stage (II)

123 Grams of graft polymer obtained in (A) of Example 2, 387.8 grams of styrene and 20 milligrams of t-butylcatechol were fed into a 3 liter three-necked separable flask with a stirrer and a reflux cooler and immersed overnight at room temperature. This mixture was dissolved (dispersed) under agitation at a temperature of lower than 70° C., and then 29.2 grams of acrylonitrile was added dropwise thereto, further continuing agitation. Thereafter, remaining 100 grams of acrylonitrile and 5.7 grams of benzoyl peroxide were added to obtain a slightly turbid viscous solution. The viscous mixture was then suspended in a mixed solution comprising 75 grams of 5% aqueous solution of partially saponified polyvinyl alcohol (KH-20), 30 grams of 0.5% sodium polyacrylate aqueous solution and 1,150 grams of deionized water. The temperature of the reaction system was raised to 75° C. and the mixture was polymerized for 5 hours and then allowed to stand at 95° C. for 3 hours to complete the suspension polymerization. Thereafter, the reaction product was filtered, washed with water and then dried at 80° C. for 10 hours to obtain the object thermoplastic resin in the yield of 98%.

EXAMPLE 3

(A) Polymerization in Stage (I)

256 Grams of EPDM rubber (EP-57P, pelletized), 144 grams of styrene, 48 grams of acrylonitrile and 2.1 grams of benzoyl peroxide were fed into a flask similar to that used in Example 2 and immersed overnight at room temperature. Then 90 grams of 5% aqueous solution of partially saponified polyvinyl alcohol (KH-20) and 585 grams of deionized water were supplied into the flask. The temperature of the reaction system was elevated to 75° C. and maintained at this level for 5.5 hours. Then the temperature was further raised to 95° C. and heating was continued at this temperature for 3 hours to complete the suspension polymerization. The obtained polymer beads were filtered, washed with water and dried overnight at 80° C. to obtain 430 grams of graft polymer (yield: 96%).

(B) Polymerization in Stage (II)

107.5 Grams of graft polymer obtained in (A) of Example 3, 399.4 grams of styrene and 20 mg of t-butylcatechol were fed into a flask same as used in (B) of Example 2 and immersed overnight at room temperature. This mixture was dissolved (dispersed) under agitation at a temperature of below 70° C., and then 33.1 grams of acrylonitrile was added dropwise under continued agitation. The mixture was further added with remaining 100 grams of acrylonitrile and 5.86 grams of benzoyl peroxide to obtain a turbid viscous solution. This viscous mixture was suspended in a solution comprising 70 grams of 5% aqueous solution of partially saponified polyvinyl alcohol (KH-20) and 1,150 grams of deionized water. Then the reaction system temperature was elevated to 75° C. and the mixture was polymerized for 5 hours and then allowed to stand at 95° C. for 3 hours to complete the suspension polymerization. The reaction product was filtered, washed with water and then dried overnight at 80° C., obtaining the object thermoplastic resin in the yield of 97%.

EXAMPLE 4

(A) Polymerization in Stage (I)

256 Grams of EPDM rubber (EP-57P, pelletized), 96 grams of styrene, 32 grams of acrylonitrile and 1.4 grams of benzoyl peroxide were supplied into a flask similar to that used in Example 2 and immersed overnight at room temperature. Then 60 grams of 5% aqueous solution of partially saponified polyvinyl alcohol (KH-20) and 500 grams of deionized water were further fed into the flask and the temperature of the reaction system was raised to 75° C. and maintained at this level for 5.5 hours. Then the temperature was further raised to 95° C. and maintained thereat for 3 hours to complete the suspension polymerization. The obtained graft polymer beads were filtered, washed with water and then dried overnight at 80° C. to obtain 364 grams of graft polymer (yield: 95%).

(B) Polymerization in Stage (II)

85.3 Grams of graft polymer obtained in (A) of Example 4 and 416 grams of styrene were fed into the flask and immersed overnight at room temperature. This reaction system was dissolved at a temperature of lower than 70° C., followed by dropwise addition of 38.6 grams of acrylonitrile under continued agitation. Then remaining 100 grams of acrylonitrile and 5.9 grams of benzoyl peroxide were added to obtain a turbid viscous solution. The viscous mixture was suspended in 70 grams of 5% aqueous solution of partially saponified polyvinyl alcohol (KH-20) and 1,150 grams of deionized water. The temperature of the reaction system was elevated to 75° C. to perform polymerization of the mixture at this temperature for 5 hours, and then the temperature was further raised to 95° C. and maintained at this level for 3 hours to complete the suspension polymerization. The reaction product was filtered, washed with water and dried overnight at 80° C. to obtain the object thermoplastic resin (yield: 98%).

EXAMPLE 5

(A) Polymerization in Stage (I)

380 Grams of EPDM rubber (EP-57P, pelletized), 570 grams of styrene, 190 grams of acrylonitrile and 11.4 grams of benzoyl peroxide were fed into a flask same as used in Example 2 and immersed overnight at room temperature. Then the mixture was further added with 136.5 grams of 5% aqueous solution of partially saponified polyvinyl alcohol (KH-20) and 1,710 grams of deionized water under agitation, and the reaction system temperature was raised to 50° C. and maintained thereat for 1 hour. Then the temperature was further raised to 80° C. for 3-hour reaction at this temperature and then to 95° C. for additional 3-hour reaction at this temperature. The obtained graft polymer beads were filtered, washed with water and dried overnight at 80° C. The amount of the graft polymer beads obtained was 1,117 grams (There was also obtained 121.5 grams of freed styrene-acrylonitrile copolymer beads.).

(B) Polymerization in Stage (II)

314.5 Grams of graft polymer obtained in (A) of Example 5 (freed AS resin component being excluded), 514.1 grams of styrene, 1.02 grams of t-dodecylmercaptan and 0.03 gram of t-butylcatechol were fed into the flask for immersion overnight at room temperature. This reaction system was dissolved (dispersed) under agitation at lower than 70° C., followed by dropwise addition of 36.0 grams of acrylonitrile under continued agitation. Then remaining 135.4 grams of acrylonitrile and 6.85 grams of benzoyl peroxide were added to obtain a turbid viscous solution, and the viscous mixture was suspended in a mixed solution consisting of 100 grams of 5% aqueous solution of partially saponified polyvinyl alcohol (KH-20) and 1,500 grams of deionized water. After replacing the atmosphere of the reaction system with nitrogen gas, the temperature was raised to 75° C. to maintain it for 3 hours and then to 95° C. to maintain it for additional 6 hours to complete the suspension polymerization. The reaction product was filtered, washed with water and dried overnight at 80° C. to obtain the object thermoplastic resin (yield: 97%).

EXAMPLE 6

(A) Polymerization in Stage (I)

380 Grams of EPDM rubber (EP-57P, pelletized), 427.5 grams of styrene, 142.5 grams of acrylonitrile and 9.5 grams of benzoyl peroxide were fed into a flask identical with that used in Example 2 and the mixture was immersed overnight at room temperature. The mixture was further added with 113.7 grams of 5% aqueous solution of partially saponified polyvinyl alcohol (KH-20) and 1,425 grams of deionized water under agitation, and then this reaction system was raised in temperature to 50° C., maintaining it for 1 hour, then to 80° C. maintained for 3 hours and further to 95° C. maintained for 3 hours to complete the suspension polymerization. The obtained graft polymer beads were filtered, washed with water and dried overnight at 80° C. There was obtained 855 grams of graft polymer. (76 Grams of freed AS resin component was also obtained).

(B) Polymerization in Stage (II)

274.8 Grams of graft polymer obtained in (A) of Example 6 (freed AS resin component being excluded), 510.9 grams of styrene, 1.08 grams of t-dodecylmercaptan and 0.03 gram of hydroquinone were fed into the flask and immersed overnight at room temperature. This reaction system was dissolved under agitation at a temperature of lower than 70° C. and then 38.2 grams of acrylonitrile was added dropwise thereto, further continuing agitation. Then remaining 143.1 grams of acrylonitrile, 33 grams of styrene and 7.25 grams of benzoyl peroxide were added dropwise to obtain a turbid viscous solution. The viscous mixture was suspended in a mixed solution comprising 100 grams of 5% aqueous solution of partially saponified polyvinyl alcohol (KH-20) and 1,500 grams of ion exchange water, and then after replacing the atmosphere of the reaction system with nitrogen gas, the system temperature was elevated to 75° C., maintaining it for 3 hours, and then to 95° C., maintaining it for additional 6 hours, to thereby complete the suspension polymerization. The resultant reaction product was filtered, washed with water and dried overnight at 80° C. to obtain the object thermoplastic resin (polymerization rate: 98%).

The properties of the thermoplastic resins obtained in Examples 1 to 6 are shown in Table 1 below.

Table 1

| | Properties of thermoplastic resins | | | | |
|---|---|---|---|---|---|
| Item Example | Izod impact strength (kg-cm/cm$^2$) | Tensile strength (kg/cm$^2$) | Thermal deformation temperature (°C.) | Rockwell hardness (R scale) | Flow characteristics (cc/sec) |
| 1 | 8.5 | 530 | 79 | 113 | $3.1 \times 10^{-3}$ |
| 2 | 7.0 | 513 | 81 | 116 | $4.5 \times 10^{-3}$ |
| 3 | 6.0 | 510 | 78 | 110 | $3.2 \times 10^{-3}$ |
| 4 | 5.7 | 527 | 80 | 109 | $2.9 \times 10^{-3}$ |
| 5 | 8.3 | 509 | 75 | 111 | $3.7 \times 10^{-3}$ |
| 6 | 7.8 | 526 | 78 | 112 | $4.0 \times 10^{-3}$ |

EXAMPLE 7

(A) Stage (I)

A mixture composed of 2,660 grams of pelletized EPDM rubber (EP-57P by Mitsubishi Petrochemical Co., iodine value: 15; Mooney viscosity $ML_{1+4}$ (100° C.): 90; diene component: ethylidene-norbornene; ethylene content: 75%, 1,995 grams of styrene, 665 grams of acrylonitrile, 53.2 grams of benzoyl peroxide, 840 grams of 5% aqueous solution of partically saponified polyvinyl alcohol (KH-20 by Nippon Gosei Kagaku) and 10,500 grams of deionized water was fed into a 30-liter autoclave and agitated at 45° to 55° C. for about one hour. The polymerization was further continued for 3 hours at 80° C. and for additional 3 hours at 95° C. The obtained graft copolymer beads were filtered, washed with water and then dried at 80° C. The yield of the obtained graft copolymer was 5,215 grams.

(B) Stage (II)

180 Grams of graft copolymer beads obtained in the stage (I) were impregnated with 615 grams of styrene containing 30 mg of tertiary butylcatechol and agitated at room temperature for 3 hours in a 3-liter pressure autoclave. Agitation was further continued at 50° to 60° C. to deform the graft copolymer and then 57.4 grams of acrylonitrile was added dropwise to form a paste-like mixture. This mixture was further added with 147.6 grams of acrylonitrile, 8.2 grams of benzoyl peroxide and 1.23 grams of tertiary dodecylmercaptan to disperse (or dissolve) the graft copolymer, obtaining a turbid viscous solution. This viscous mixture was heated in a nitrogen atmosphere under agitation at 70° C. for 1 hour, then at 80° C. for 2 hours and further at 95° C. hours to complete polymerization. After dissolving the product, it was taken out of the autoclave and ground into fine fragments by a crusher. Yield of the obtained termoplastic resin: 920 grams.

EXAMPLES 8 – 12

The graft copolymer beads obtained in (A) of Example 7, tertiary butylcatechol, styrene, acrylonitrile, benzoyl peroxide and tertiary dodecylmercaptan were fed in amounts shown in Table 2 and polymerized according to the method described in (B) of Example 7 to obtain the object thermoplastic resins.

The properties of the thermoplastic resins obtained in Examples 7 to 12 are shown in Table 3.

Table 2

| | Formulation | | | | | | |
|---|---|---|---|---|---|---|---|
| Composition Example | Graft copolymer obtained in Example 7 (g) | Styrene (g) | Tertiary butyl-catechol (g) | Primary acrylo-nitrile (g) | Secondary acrylo-nitrile (g) | Benzoyl peroxide (g) | Tertiary dodecyl-mercaptan (g) |
| 8 | 240 | 570 | 30 | 53.2 | 136.8 | 7.6 | 1.14 |
| 9 | 300 | 525 | 30 | 49.0 | 126 | 7.0 | 1.05 |
| 10 | 360 | 480 | 30 | 44.8 | 115.2 | 6.4 | 0.96 |
| 11 | 420 | 435 | 30 | 40.6 | 104.4 | 5.8 | 0.87 |

Table 2-continued

| Composition Example | Graft copolymer obtained in Example 7 (g) | Styrene (g) | Tertiary butyl-catechol (g) | Primary acrylo-nitrile (g) | Secondary acrylo-nitrile (g) | Benzoyl peroxide (g) | Tertiary dodecyl-mercaptan (g) |
|---|---|---|---|---|---|---|---|
| 12 | 480 | 390 | 30 | 36.4 | 93.6 | 5.2 | 0.78 |

Table 3

Properties of obtained thermoplastic resins

| Properties Example | Izod impact strength (kg-cm/cm²) | Tensile strength (kg/cm²) | Termal deformation temperature (°C.) | Rockwell hardness (R) | Flow characteristics ($\times 10^{-3}$ cc/sec) |
|---|---|---|---|---|---|
| 7 | 6.2 | 562 | 85 | 120 | 4.3 |
| 8 | 7.8 | 531 | 82 | 118 | 5.1 |
| 9 | 8.3 | 508 | 80 | 115 | 3.4 |
| 10 | 9.6 | 476 | 78 | 111 | 3.2 |
| 11 | 14.3 | 452 | 77 | 105 | 2.6 |
| 12 | 23.4 | 435 | 75 | 101 | 2.1 |

EXAMPLE 13

(A) Polymerization in Stage (I)

A mixture consisting of 380 grams of pelletized EPDM rubber (EP-57P by Mitsubishi Petrochemical Co., iodine value: 15; Mooney viscosity $ML_{1+4}$ (100° C.) 90; diene component: ethylidene-norbornene; ethylene content: 75%), 285 grams of styrene, 95 grams of acrylonitrile, 7.6 grams of benzoyl peroxide, 91 grams of a 5% aqueous solution of partially saponified polyvinyl alcohol (KH-20 by Nippon Gosei Kagaku Co.) and 1,140 grams of deionized water was put into a 3-liter three-necked flask and agitated at 45° to 55° C. for about 1 hour. Then the mixture was polymerized at 75° C. for 3 hours and then at 95° C. for additional 3 hours, and the obtained graft copolymer beads were filtered, washed with water and dried at 80° C., obtaining 706 grams of graft copolymer.

(B) Polymerization in Stage (II)

240 Grams of the graft copolymer beads obtained in (A) above were immersed in 570 grams of styrene containing 30 mg of hydroquinone at room temperature for 2 hours, and the mixture was agitated at 50° to 60° C. to let the graft copolymer loose its original form, and then 40 grams of acrylonitrile was further added dropwise to form a paste-like mixture. This mixture was further added with 150 grams of acrylonitrile, 7.6 grams of benzoyl peroxide and 1.14 grams of lauryl mercaptan to disperse (or dissolve) the graft copolymer, obtaining a slightly turbid viscous solution. This viscous mixture was subjected to bulk polymerization in a nitrogen atmosphere at 70° to 75° C. for 1 hour under agitation, followed by addition of 100 grams of 5% aqueous solution of partially saponified polyvinyl alcohol and 1,500 grams of deionized water for additional 3-hour suspension polymerization at 75° C. The mixture was further heated at 95° C. for 6 hours to complete the polymerization. The obtained product was filtered, washed with water and dried overnight at 80° C. to obtain the desired thermoplastic resin (yield: 98%).

EXAMPLE 14

240 Grams of graft copolymer beads synthesized by the method used in (A) of Example 13 was immersed in 498.2 grams of styrene containing 30 mg of hydroquinone at room temperature for 2 hours and agitated at 50° to 60° C. to deform the graft copolymer beads, and then 30 grams of acrylonitrile was added dropwise to form a paste-like mixture. This mixture was further added with 147.3 grams of acrylonitrile, 84.4 grams of methyl methacrylate, 7.6 grams of benzoyl peroxide and 1.14 grams of laurylmercaptan to disperse (or dissolve) the graft copolymer, obtaining a slightly turbid viscous solution. This viscous mixture was subjected to 40-minute bulk polymerization in a nitrogen atmosphere at 70° to 75° C. under agitation and then added with 100 grams of 5% aqueous solution of partially saponified polyvinyl alcohol (KH-20) and 1,500 grams of deionized water for performing additional 3.5-hour suspension polymerization at 75° C. The mixture was further heated at 95° C. for 6 hours to complete the polymerization. The product was filtered and washed with water, and the obtained thermoplastic resin was dried overnight at 80° C. Yield: 98%.

EXAMPLE 15

A mixture formed from 240 grams of graft copolymer beads obtained in the same way as used in (A) of Example 13, 30 mg of hydroquinone, 537 grams of styrene, 28.5 grams of acrylonitrile, 4 grams of a 5% aqueous solution of partially saponified polyvinyl alcohol (KH-20) and 60 grams of deionized water was agitated at 50° to 60° C. to deform the graft copolymer beads, followed by dropwise addition of 28.5 grams of acrylonitrile to obtain a paste-like mixture. This mixture was further added with 133 grams of acrylonitrile, 33 grams of styrene, 1.9 grams of benzoyl peroxide, 31 grams of lauroyl peroxide and 1.33 grams of laurylmercaptan to disperse (or dissolve) the graft copolymer, obtaining a white-turbid viscous solution. This viscous mixture was subjected to bulk polymerization in a nitrogen atmosphere at 65° to 70° C. for 1 hour under agitation and then added with 96 grams of a 5% aqueous solution of partially saponified polyvinyl alcohol (KH-20) and 1,440 grams of deionized water for additional 3-hour suspension polymerization at 68° C., followed by further heating at 95° C. for 6 hours to complete the polymerization. The product was filtered and washed with water, and the obtained thermoplastic resin was dried overnight at 80° C. Yield: 97.5%.

EXAMPLE 16

(A) Polymerization in Stage (I)

300 Grams of pelletized EPDM rubber (EP-57P), 450 grams of styrene, 150 grams of acrylonitrile, 9.0 grams of benzoyl peroxide, 108 grams of a 5% aqueous solution of partially saponified polyvinyl alcohol (KH-20) and 1,350 grams of deionized water were mixed and agitated at 45° to 55° C. for about 1 hour, followed by polymerization at 75° C. for 3 hours and then at 95° C. for additional 3 hours. The obtained graft copolymer was filtered, washed with water and dried at 80° C. Yield of the obtained graft copolymer was 880 grams.

(B) Polymerization in Stage (II)

360 Grams of the graft copolymer obtained in (A) above, 30 mg of hydroquinone, 480 grams of styrene, 120 grams of acrylonitrile, 8 grams of a 5% aqueous solution of partially saponified polyvinyl alcohol (KH-20) and 120 grams of deionized water were mixed and agitated at 50° to 60° C. to disperse (or dissolve) the graft copolymer, obtaining a white-turbid viscous solution. The mixture was further added with 40 grams of acrylonitrile, 6.4 grams of benzoyl peroxide and 0.96 gram of laurylmercaptan for performing bulk polymerization in a nitrogen atmosphere at 70° to 75° C. for 1 hour. Thereafter, 92 grams of 5% aqueous solution of partially saponified polyvinyl alcohol (KH-20) and 1,380 grams of deionized water were added for accomplishing suspension polymerization at 75° C. for 3 hours, followed by further heating at 95° C. for 6 hours to complete the polymerization. The product was filtered and washed with water, and the obtained thermoplastic resin was dried overnight at 80° C.

EXAMPLE 17

(A) Polymerization in Stage (I)

A mixed solution was prepared by mixing 380 grams of pelletized EPDM rubber (EP-57P), 285 grams of styrene, 95 grams of acrylonitrile, 1.9 grams of benzoyl peroxide, 1.9 grams of t-butyl peroxybenzoate, 91 grams of a 5% aqueous solution of partially saponified polyvinyl alcohol (KH-20) and 1,140 grams of deionized water, and this mixed solution was fed into a 4-liter autoclave and agitated at 45° to 55° C. for about 1 hour, followed by polymerization at 80° C. for 3 hours, then at 105° C. for 1 hour and further at 135° C. for 3 hours under agitation, and the obtained graft polymer beads were filtered, washed with water and dried at 80° C. There was obtained 746 grams of graft copolymer.

(B) Polymerization in Stage (II)

Polymerization was carried out by using the same apparatus and same process as (B) of Example 13 except for use of 240 grams of the graft copolymer obtained in the stage (I), resultantly obtaining the object thermoplastic resin.

EXAMPLE 18

(A) Polymerization in Stage (I)

Polymerization was performed by using the same apparatus and same procedure as (A) of Example 13 but by using 11.4 grams of benzoyl peroxide instead of 7.6 grams of benzoyl peroxide used in (A) of Example 13, consequently obtaining the desired graft copolymer.

(B) Polymerization in Stage (II)

Polymerization was practiced by following the same procedure as (B) of Example 13 except for use of 240 grams of the graft copolymer obtained in (A) of this example, resultantly obtaining the desired thermoplastic resin.

EXAMPLE 19

(A) Polymerization in Stage (I)

A mixture of 500 grams of pelletized EPDM rubber (EP-57P), 116.7 grams of acrylonitrile, 327.8 grams of styrene, 55.6 grams of methyl methacrylate, 10.0 grams of benzoyl peroxide, 120 grams of a 5% aqueous solution of partially saponified polyvinyl alcohol (KH-20) and 1,500 grams of deionized water was put into a 3-liter three-necked flask and agitated at 45° to 55° C. for about 1 hour, followed by heating at 75° C. for 3 hours and at 95° C. for additional 3 hours to complete the polymerization. The obtained graft copolymer beads were filtered, washed with water and dried at 80° C.

(B) Polymerization in Stage (II)

240 Grams of the graft copolymer beads obtained in (A) of this example was immersed in 498.2 grams of styrene containing 30 mg of hydroquinone at room temperature for 2 hours and then agitated at 50° to 60° C. to get the graft copolymer out of its original shape, followed by dropwise addition of 30 grams of acrylonitrile to form a paste-like mixture. The mixture was further added with 147.3 grams of acrylonitrile, 84.4 grams of methyl methacrylate, 7.6 grams of benzoyl peroxide and 1.14 grams of lauryl mercaptan to disperse (or dissolve) the graft copolymer, obtaining a slightly turbid viscous solution. This viscous mixture was then subjected to bulk polymerization in a nitrogen atmosphere at 70° to 75° C. for 1 hour and then added with 100 grams of a 5% aqueous solution of partially saponified polyvinyl alcohol (KH-20) and 1,500 grams of deionized water for performing 3-hour suspension polymerization at 75° C., followed by further heating at 95° C. for 6 hours to complete the polymerization. The product was filtered and washed with water, and the obtained thermoplastic resin was dried overnight at 80° C.

EXAMPLE 20

(A) Polymerization in Stage (I)

500 Grams of pelletized EPDM rubber (EP-57P), 400 grams of styrene, 100 grams of acrylonitrile, 10.0 grams of benzoyl peroxide, 120 grams of a 5% aqueous solution of partially saponified polyvinyl alcohol (KH-20) and 1,500 grams of deionized water were mixed together, and this mixture was put into a 3-liter three-necked flask and agitated at a temperature of 45° to 55° C. for about 1 hour, followed by polymerization at 75° C. for 3 hours and then at 95° C. for additional 3 hours, and the obtained graft copolymer beads were filtered, washed with water and dried at 80° C.

(B) Polymerization in Stage (II)

Polymerization was practiced by using the same apparatus and same procedure as (B) of Example 13 except for use of 240 grams of the graft copolymer beads obtained in (A) of the present example, resultantly obtaining the object thermoplastic resin.

EXAMPLE 21

(A) Polymerization in Stage (I)

A mixture consisting of 600 grams of EPDM rubber (EP-57P) in pellet form, 225 grams of styrene, 75 grams of acrylonitrile, 9.0 grams of benzoyl peroxide, 108 grams of a 5% aqueous solution of partially saponified polyvinyl alcohol (KH-20) and 1,350 grams of deionized water was put into a 3-liter three-necked flask and agitated at 45° to 55° C. for about 1 hour, and then the mixture was further polymerized at 75° C. for 3 hours and at 95° C. for additional 3 hours. The obtained graft copolymer beads were filtered, washed with water and dried at 80° C.

(B) Polymerization in Stage (II)

225 Grams of the copolymer beads obtained in (A) of this example were immersed overnight at room temperature in 581 grams of styrene containing 30 mg of hydroquinone and the mixture was agitated at 50° to 60° C. to let the graft copolymer lose its original shape, followed by dropwise addition of 40 grams of acrylonitrile to form a paste-like mixture. The mixture was further added with 154 grams of acrylonitrile, 7.8 grams of benzoyl peroxide and 1.16 grams of tert-laurylmercaptan to disperse (or dissolve) the graft copolymer to obtain a turbid viscous solution. This viscous mixture was then subjected to 30-minute bulk polymerization in a nitrogen atmosphere at 70° to 75° C. under agitation and then added with 100 grams of a 5% aqueous solution of partially saponified polyvinyl alcohol (KH-20) and 1,500 grams of deionized water for effecting 3-hour suspension polymerization at 75° C. This was followed by additional 6-hour heating at 95° C. to complete the polymerization, and the resultant product was filtered and washed with water to obtain the object thermoplastic resin.

EXAMPLE 22

(A) Polymerization in Stage (I)

A mixed solution comprising 500 grams of pelletized EPDM rubber (MITSUI EPT-3091 by Mitsui Sekiyu Kagaku Kogyo Co., Ltd., iodine value: 16; Mooney viscosity ML1+4 (100° C.): 80), 375 grams of styrene, 125 grams of acrylonitrile, 10 grams of benzoyl peroxide, 120 grams of a 5% aqueous solution of partially saponified polyvinyl alcohol (KH-20) and 1,400 grams of deionized water was put into a 3-liter three-necked flask and agitated at 45° to 55° C. for about 1 hour, followed by polymerization at 80° C. for 3 hours and then at 95% for additional 3 hours, and the obtained graft copolymer was filtered, washed with water and then dried at 80° C.

(B) Polymerization in Stage (II)

240 Grams of the graft copolymer beads obtained in (A) of this example were mixed and agitated in 570 grams of styrene containing 30 mg of n-butylcatechol at room temperature for 2 hours and then the mixture was further agitated at 50° to 60° C. to collapse the original form of the graft copolymer, followed by dropwise addition of 53.2 grams of acrylonitrile to form a paste-like mixture. The mixture was further added with 136.8 grams of acrylonitrile, 3.8 grams of benzoyl peroxide, 6.3 grams of lauroyl peroxide and 1.16 grams of t-dodecylmercaptan to disperse (or dissolve) the graft copolymer to obtain a turbid viscous solution. This viscous mixture was subjected to 30-minute bulk polymerization at 65° to 70° C. in a nitrogen atmosphere under agitation and then added with 150 grams of a 5% aqueous solution of partially saponified polyvinyl alcohol (KH-20) and 1,500 grams of deionized water to perform 4-hour suspension polymerization at 75° C., followed by additional 6-hour heating at 95° C. to complete the polymerization. The resultant product was filtered, washed with water and then dried at 80° C. to obtain the desired thermoplastic resin.

EXAMPLE 23

340 Grams of the graft copolymer beads obtained in Example 22 were mixed and agitated in 495 grams of styrene containing 30 mg of tertiary butylcatechol at room temperature for 3 hours and the mixture was further agitated at 50° to 60° C. to collapse the graft copolymer beads, followed by dropwise addition of 46.2 grams of acrylonitrile to form a paste-like mixture. The mixture was then added with 118.8 grams of acrylonitrile, 3.3 grams of benzoyl peroxide, 6.3 grams of lauroyl peroxide and 1.16 grams of tertiary dodecylmercaptan to disperse (or dissolve) the graft copolymer to obtain a turbid viscous solution. This viscous mixture was subjected to 30-minute bulk polymerization in a nitrogen atmosphere at 65° to 70° C. under agitation and then added with 150 grams of a 5% aqueous solution of partially saponified polyvinyl alcohol (KH-20) and 1,500 grams of deionized water to perform 4-hour suspension polymerization at 75° C., followed by additional 6-hour heating at 95° C. to complete the polymerization. The obtained product was filtered, washed with water and then dried at 80° C.

EXAMPLE 24

(A) Polymerization in Stage (I)

A mixed solution prepared by mixing 380 grams of cut pieces of EPDM rubber (MITSUI EPT-3045 by Mitsui Sekiyu Kagaku Kogyo Co., iodine value: 12; Mooney viscosity $ML_{1+4}$ (100° C.): 40), 285 grams of styrene, 95 grams of acrylonitrile, 11.4 grams of benzoyl peroxide, 120 grams of a 5% aqueous solution of partially saponified polyvinyl alcohol (KH-20) and 1,300 grams of deionized water was put into a 3-liter three-necked flask and agitated at 45° to 55° C. for about 1 hour, followed by polymerization at 80° C. for 3 hours and then at 95° C. for additional 3 hours, and the obtained graft copolymer was filtered, washed with water and dried at 80° C.

(B) Polymerization in Stage (II)

240 Grams of the graft copolymer beads obtained in (A) above were mixed and agitated in 495 grams of styrene containing 30 mg of tertiary butyl catechol at room temperature for 3 hours and the mixture was further agitated at 50° to 60° C. to break up the graft copolymer beads, followed by dropwise addition of 46.2 grams of acrylonitrile to form a paste-like mixture. This mixture was further added with 143.8 grams of acrylonitrile, 3.8 grams of benzoyl peroxide, 5.4 grams of lauroyl peroxide and 1.00 gram of tertiary dodecylmercaptan to disperse (or dissolve) the graft copolymer to obtain a turbid viscous solution. This viscous mixture was subjected to 30-minute bulk polymerization in a nitrogen atmosphere at 65° to 70° C. under agitation and then added with 150 grams of a 5% aqueous solution of partially saponified polyvinyl alcohol (KH-20) and 1,500 grams of deionized water for 4-hour suspension polymerization at 75° C. This was followed by additional 6-hour heating at 95° C. to complete the polymerization, and the product was filtered, washed with water and then dried at 80° C. to obtain the desired thermoplastic resin.

The properties of the thermoplastic resins obtained in Examples 13 to 24 are shown in Table 4 below.

Table 4

| | Properties of obtained thermoplastic resins | | | |
|---|---|---|---|---|
| Example | Izod impact strength (notched test pieces) (kg-cm/cm$^2$) | Tensile strength (kg/cm$^2$) | Thermal deformation temperature (°C.) | Rockwell hardness (R scale) |
| 13 | 9.3 | 481 | 81 | 110 |
| 14 | 8.4 | 515 | 81 | 108 |

Table 4-continued

| | Properties of obtained thermoplastic resins | | | |
|---|---|---|---|---|
| Example | Izod impact strength (notched test pieces) (kg-cm/cm$^2$) | Tensile strength (kg/cm$^2$) | Thermal deformation temperature (°C.) | Rockwell hardness (R scale) |
| 15 | 7.7 | 520 | 79 | 110 |
| 16 | 7.9 | 539 | 81 | 112 |
| 17 | 8.5 | 498 | 79 | 106 |
| 18 | 8.6 | 537 | 81 | 107 |
| 19 | 8.5 | 541 | 80 | 109 |
| 20 | 6.3 | 529 | 83 | 110 |
| 21 | 14.5 | 429 | 78 | 102 |
| 22 | 10.1 | 501 | 81 | 111 |
| 23 | 8.4 | 508 | 79 | 106 |
| 24 | 10.1 | 426 | 80 | 101 |

Table 5 below shows the results of the weather resistance tests conducted on the thermoplastic resins obtained Examples 1-6, 13, 22 and 24.

Table 5

| | Weather resistance of thermoplastic resins | | | | |
|---|---|---|---|---|---|
| Irradiation time | Item Izod impact strength (kg-cm/cm$^2$) | | | | |
| Example | 0 hr | 50 hrs | 100 hrs | 200 hrs | 500 hrs |
| 1 | 86 | 83 | 73 | 53 | 32 |
| 2 | 98 | 89 | 75 | 50 | 30 |
| 3 | 105 | 93 | 79 | 54 | 29 |
| 4 | 92 | 87 | 69 | 49 | 31 |
| 5 | 88 | 81 | 65 | 44 | 32 |
| 6 | 94 | 80 | 71 | 48 | 34 |
| 13 | 85 | 83 | 71 | 58 | 31 |
| 22 | 101 | 95 | 87 | 72 | 38 |
| 24 | 116 | 108 | 97 | 81 | 41 |

EXAMPLE 25

(A) Polymerization in Stage (I)

750 Grams of EPDM rubber (EP-57C by Mitsubishi Petrochemical Co., iodine value: 15; Mooney viscosity ML$_{1+4}$(100° C.): 90; non-conjugated diene component: ethylidene-norbornene; ethylene content: 75%), 375 grams of styrene, 125 grams of acrylonitrile and 5.0 grams of benzoyl peroxide were fed into a 5-liter four-necked separable flask equipped with an agitator, a thermometer and a reflux cooler and subjected to 5-hour immersion at room temperature. After adding 320 grams of a 5% aqueous solution of partially saponified polyvinyl alcohol (KH-20) and 460 grams of 0.4% sodium polyacrylate aqueous solution, the mixture temperature was raised to 50° C. and agitation was continued for 2 hours. In order to grind the EPDM rubber in this mixed solution into fine pieces, the mixture was subjected to 30-minute mixing in a convectional high mixer (T.K. Homomixer by Tokushu Kikai Kogyo Co., Ltd.) operated at 60 V. Thereafter, this mixed solution was heated at 80° C. for 3 hours and then at 95° C. for 4 hours, and the obtained graft copolymer was filtered, washed with water and then dried at 80° C. for 8 hours to obtain 481 grams of the object graft copolymer.

(B) Polymerization in Stage (II)

240 Grams of the graft copolymer obtained in (A) of Example 1, 1,500 grams of deionized water, 10 grams of a 0.4% sodium polyacrylate aqueous solution and 80 grams of a 5% aqueous solution of partially saponified polyvinyl alcohol (KH-20) were fed into a 3-liter four-necked flask attached with a stirrer, a thermometer and a reflux cooler, and this mixture was agitated and raised in temperature to 65° C. Then a mixed solution comprising 537 grams of styrene, 20 grams of ethyldiphenyl (Arocizer-202 by Shin Nippon Seitetsu Kagaku Kogyo Co., Ltd.), 4 grams of fluid paraffin and 30 mg of tertiary butylcatechol was added dropwise into the flask and the mixture was agitated at 65° C. for 4 hours. Further added dropwise to this system under agitation was a mixed solution comprising 33 grams of styrene, 4.17 grams of lauroyl peroxide, 2.53 grams of benzoyl peroxide and 1.14 grams of tertiary dodecylmercaptan, and this was continued at 50° C. for 0.5 hour, followed by additional feed of 70 grams of a 5% aqueous solution of partially saponified polyvinyl alcohol (KH-20 by Nippon Gosei Kagaku Kogyo Co., iodine value: 78.5–81.5% by mole) and 90 grams of a 0.4% sodium polyacrylate aqueous solution (Aron-Vis M by Towa Gosei Kagaku Co.). Thereafter, 190 grams of acrylonitrile was added dropwise and nitrogen gas was introduced into the polymerization system while maintaining the system temperature at 50° C. for 0.5 hour. Then the mixture was further subjected to suspension polymerization at 70° C. for 4 hours and then at 95° C. for additional 4 hours to complete the polymerization. The resultant product was filtered, washed with water two to three times and then dried at 80° C., obtaining 959 grams of the desired thermoplastic resin.

EXAMPLE 26

(A) Polymerization in Stage (I)

480 Grams of a 5% aqueous solution of partially saponified polyvinyl alcohol (KH-20 by Nippon Gosei Kagaku Kogyo Co., degree of saponification: 78.5–81.5% by mole), 690 grams of a 0.4% sodium polyacrylate aqueous solution (Aron-Vis M by Towa Gosei Kagaku Co.) and 4,836 grams of deionized water were fed into a 10-liter four-necked separable flask mounted with a stirrer, a thermometer and a reflux cooler, followed by additional feed of 750 grams of EPDM rubber (EP-57C by Mitsubishi Petrochemical Co., iodine value: 15; Mooney viscosity ML$_{1+4}$(100° C.): 90; non-conjugated diene component: ethylidene-norbornene; ethylene content: 75%) and further agitation of the mixture. After elevating the temperature of this mixed solution to 50° C., 562.5 grams of styrene, 187.5 grams of acrylonitrile and 14.06 grams of benzoyl peroxide were added dropwise to said mixed solution through the period of about 45 minutes, followed by 2-hour agitation. Then the mixture was further subjected to suspension polymerization for 3 hours at 80° C. and then for additional 3 hours at 95° C. to complete the polymerization. The obtained graft copolymer was filtered, washed with water and dried at 80° C. for 8 hours. The yield of the thus obtained object graft copolymer was 1,488 grams.

(B) Polymerization in Stage (II)

240 Grams of the graft copolymer obtained in (A) above, 1,500 grams of deionized water, 10 grams of a 0.4% sodium polyacrylate aqueous solution and 80 grams of a 5% aqueous solution of partially saponified polyvinyl alcohol (KH-20) were fed into a 3-liter four-necked flask, and after elevating the system temperature to 65° C., a mixed solution comprising 537 grams of styrene, 20 grams of ethyldiphenyl (Arocizer-202 by Shin Nippon Seitetsu Kagaku Kogyo Co.), 4 grams of fluid paraffin and 30 mg of tertiary butylcatechol was added dropwise to said system under agitation, and agitation was continued at 65° C. for 4 hours. In order to grind the graft copolymer in said mixed solution, the mixture was put into a convectional high mixer (T.K. Homomixer by Tokushu Kika Kogyo Co., 60 V) for 30-minute mixing therein at 55° C. Then further added dropwise to the system under agitation was a mixed solution of 33 grams of styrene, 4.17 grams of lauroyl peroxide, 2.53 grams of benzoyl peroxide and 1.14 grams of tertiary dodecylmercaptan, maintaining the temperature at 55° C. for 30 minutes, followed by further addition of 70 grams of a 5% aqueous solution of partially saponified polyvinyl alcohol (KH-20) and 90 grams of a 0.4% sodium polyacrylate aqueous solution. Thereafter, 190 grams of acrylonitrile was added dropwise and then nitrogen gas was introduced into the polymerization system, maintaining this condition at 55° C. for 30 minutes. Then the mixture was further heated at 70° C. for 4 hours and at 95° C. for additional 4 hours to complete the suspension polymerization. The produced resin was filtered, washed with water two to three times and then dried at 80° C., obtaining 977 grams of the desired thermoplastic resin (yield: 97%).

EXAMPLE 27

(A) Polymerization in Stage (I)

256 Grams of broken pieces of EPDM rubber (EP-57P by Mitsubishi Petrochemical Co., iodine value: 15; Mooney viscosity $ML_{1+4}$ (100° C.): 90; non-conjugated diene component: ethylidene-norbornene; ethylene content: 75%) were immersed in a mixed solution of 192 grams of styrene, 64 grams of acrylonitrile and 5.1 grams of benzoyl peroxide at room temperature for 15 hours, and then the mixture was fed into a 1-liter autoclave and further subjected to 1-hour immersion at 50° C.

The broken pieces of EPDM rubber were swollen by the mixed solution of styrene, acrylonitrile and benzoyl peroxide. The thus obtained mixture was polymerized at 65° C. for 5 hours and then at 75° C. for 3 hours. There was obtained 506 grams of the desired graft copolymer.

(B) Polymerization in Stage (II)

100 Grams of small pieces of the obtained graft copolymer were immersed in a mixed solution consisting of 567 grams of styrene, 200 grams of acrylonitrile, 4 grams of fluid paraffin and 30 mg of tertiary butylcatechol at room temperature for 3 hours and then fed into a 3-liter three-necked separable flask. The mixed solution in the flask was then subjected to 1-hour mixing by using a convectional high mixer (T.K. Homomixer by Tokushu Kika Kogyo Co.) operated at 60 V, and then further added with 100 grams of finely divided graft polymer, followed by 40-minute mixing. The mixture was then further added with 33 grams of styrene, 2.67 grams of benzoyl peroxide, 4.39 grams of lauroyl peroxide and 1.2 grams of tertiary dodecylmercaptan and agitated by the stirrer. This viscous mixed solution was further added and suspended with 150 grams of a 5% aqueous solution of partially saponified polyvinyl alcohol (KH-20 by Nippon Gosei Kagaku Kogyo Co., degree of saponification: 78.5-81.5% by mole), 150 grams of a 0.4% sodium polyacrylate aqueous solution (Aron-Vis M by Towa Gosei Kagaku Co.) and 1,500 grams of deionized water, followed by suspension polymerization at 70° C. for 4 hours, then at 80° C. for 2 hours and finally at 95° C. for 4 hours to complete the suspension polymerization. The reaction product was filtered, washed with water two to three times and then dried under heating at 80° C. to obtain the object thermoplastic resin (yield: 97%).

EXAMPLE 28

(A) Polymerization in Stage (I)

250 Grams of pelletized EPDM rubber (MITSUI EPT-3091 by Mitsui Sekiyu Kagaku Kogyo Co., iodine value: 16; Mooney viscosity $ML_{1+4}$ (100° C.): 80; non-conjugated diene component; ethylidene-norbornene), 375 grams of styrene, 125 grams of acrylonitrile and 5.0 grams of benzoyl perioxide were supplied into a 5-liter four-necked separable flask equipped with a stirrer, a thermometer and a reflux cooler and subjected to 15-hour immersion at room temperature. Then, 320 grams of a 5% aqueous solution of partially saponified polyvinyl alcohol (KH-20), 460 grams of a 0.4% sodium polyacrylate aqueous solution and 3,224 grams of deionized water were added to the mixture and agitated. This mixture was raised in temperature to 50° C. and further agitated for 1 hour, followed by heating at 80° C. for 3 hours and then at 95° C. for additional 3 hours, and the produced graft copolymer was filtered, washed with water and dried at 80° C. for 8 hours, obtaining 486 grams of the desired graft copolymer.

(B) Polymerization in Stage (II)

360 Grams of ground particles (average particle size being about 3 mm) of the graft copolymer obtained in (A) of Example 28 and ground by a grinder (HORAI GRINDER L-120 by Horai Tekkojo Co., Ltd.), 1,500 grams of deionized water, 10 grams of a 0.4% sodium polyacrylate aqueous solution and 80 grams of a 5% aqueous solution of partially saponified polyvinyl alcohol (KH-20) were fed into a 3-liter four-necked separable flask provided with a stirrer, a thermometer and a reflux cooler, and the mixture temperature was elevated at 65° C. while agitating the mixture. Then a mixed solution of 447 grams of styrene, 20 grams of ethyldiphenyl, 4 grams of fluid paraffin and 30 mg of tertiary butylcatechol was added dropwise into the flask, followed by 4-hour agitation at 65° C. Then further added dropwise to this system under agitation was a mixed solution comprising 33 grams of styrene, 4.17 grams of lauroyl peroxide, 2.53 grams of benzoyl peroxide and 1.14 grams of tertiary dodecylmercaptan, maintaining this condition at 50° C. for 0.5 hour, followed by additional feed of 70 grams of a 5% aqueous solution of partially saponified polyvinyl alcohol (KH-20) and 90 grams of a 0.4% sodium polyacrylate aqueous solution. Thereafter, 160 grams of acrylonitrile was added dropwise and the polymerization system was maintained at 50° C. for 0.5 hour while introducing nitrogen gas into the system. Then the mixture was further heated at 70° C. for 4 hours and then at 95° C. for additional 4 hours to complete the suspension polymerization. The produced resin was filtered, washed with water two to three times and then dried at 80° C. 964 Grams of the desired thermoplastic resin was obtained.

EXAMPLE 29

(A) Polymerization in Stage (I)

480 Grams of a 5% aqueous solution of partially saponified polyvinyl alcohol (KH-20), 690 grams of a 0.4% sodium polyacrylate aqueous solution and 4,830 grams of deionized water were poured into a 10-liter four-necked separable flask equipped with a stirrer, a thermometer and a reflux cooler, and then 750 grams of EPDM rubber (EP-57C by Mitsubishi Petrochemical Co. having the properties same as said above) was supplied into the flask and the mixture was agitated. The temperature of this mixed solution was raised to 50° C.

and then 562.5 grams of styrene, 187.5 grams of acrylonitrile and 14.66 grams of benzoyl peroxide were added dropwise to the mixture through the period of about 60 minutes, followed by 2-hour agitation of the mixture. Then the mixture was further heated at 80° C. for 3 hours and then at 95° C. for additional 3 hours to complete the suspension polymerization. The obtained graft copolymer was filtered, washed with water and dried at 80° C. for 8 hours. Yield was 1,510 grams.

(B) Polymerization in Stage (II)

240 Grams of the graft copolymer obtained in (A) of Example 29, 1,500 grams of deionized water, 10 grams of a 0.4% sodium polyacrylate aqueous solution and 80 grams of a 5% aqueous solution of partially saponified polyvinyl alcohol (KH-20) were supplied into a 3-liter four-necked separable flask provided with a stirrer, a thermometer and a reflux cooler. To this system was further added a mixture of 537 grams of styrene, 100 grams of acrylonitrile and 30 mg of tertiary butylcatechol and the temperature of the polymerization system was raised to 55° C. The graft copolymer in this mixed solution was ground into fine pieces and impregnated with the vinyl compounds in a convectional high mixer (T.K. Homomixer) at 50° C. for the period of 30 minutes. Then a mixed solution comprising 33 grams of styrene, 90 grams of acrylonitrile, 4.17 grams of lauroyl peroxide, 2.53 grams of benzoyl peroxide and 1.14 grams of tertiary dodecylmercaptan was added dropwise to this system under agitation at 55° C. for the period of 30 minutes, followed by additional supply of 70 grams of a 5% aqueous solution of partially saponified polyvinyl alcohol (KH-20) and 90 grams of a 0.4% sodium polyacrylate aqueous solution, and then nitrogen gas was introduced into the polymerization system maintained at 55° C. for 30 minutes. The mixture was further heated at 70° C. for 4 hours and then at 95° C. for additional 4 hours to complete the suspension polymerization. The produced resin was filtered, washed with water two to three times and then dried at 80° C., obtaining 978 grams of the desired thermoplastic resin (yield: 97%).

EXAMPLE 30

(A) Stage (I)

A mixture prepared from 350 grams of fine pieces of EPDM rubber (EP-57C by Mitsubishi Petrochemical Co., Ltd.), 262.5 grams of styrene, 87.5 grams of acrylonitrile, 7.02 grams of benzoyl peroxide, 140 grams of a 5% aqueous solution of partially saponified polyvinyl alcohol (KH-20) and 196 grams of a 0.4% sodium polyacrylate aqueous solution and 1,600 grams of deionized water was put into a 3-liter three-necked flask and agitated at 45° to 55° C. for about 1 hour, and then the mixture was polymerized at 80° C. for 3 hours and then at 95° C. for additional 3 hours. The obtained graft copolymer (in the form of beads) was filtered, washed with water and dried at 80° C.

(B) Stage (II)

240 Grams of the graft copolymer synthesized in the stage (I) was impregnated with 570 grams of styrene containing 0.66 grams of triallyl isocyanurate and 30 mg of tertiary butylcatechol at room temperature under agitation for 3 hours, followed by further agitation at 50° to 60° C. to break down the shape of the graft copolymer beads, and then 42 grams of acrylonitrile was added dropwise to form a paste-like mixture. The mixture was further added with 148 grams of acrylonitrile, 2.54 grams of benzoyl peroxide, 4.17 grams of lauroyl peroxide and 1.14 grams of tertiary dodecylmercaptan to dissolve (or disperse) the graft copolymer, obtaining a turbid viscous solution. This viscous mixture was then subjected to 30-minute bulk polymerization in a nitrogen atmosphere at 65° to 70° C. under agitation, followed by addition of 70 grams of a 5% aqueous solution of partially saponified polyvinyl alcohol (KH-20), 90 grams of a 0.4% sodium polyacrylate aqueous solution and 1,500 grams of deionized water for practicing 4-hour suspension polymerization at 75° C. This was further followed by 6-hour heating at 95° C. to complete the polymerization, and the resultantly obtained thermoplastic resin was filtered, washed with water and then dried at 80° C.

EXAMPLE 31

(A) Polymerization in Stage (I)

140 Grams of a 5% solution of partially saponified polyvinyl alcohol (KH-20), 196 grams of a 0.4% sodium polyacrylate aqueous solution and 1,600 grams of deionized water were supplied into a 3-liter four-necked separable flask furnished with a stirrer, a thermometer and a reflux cooler, and then the mixture was further added with 350 grams of EPDM rubber (EP-57C) and agitated. The temperature of this mixed solution was elevated to 50° C., and then 262.5 grams of styrene, 87.5 grams of acrylonitrile, 0.88 gram of 1,3,5-triacryloylhexahydro-s-triazine and 7.02 grams of benzoyl peroxide were added dropwise through the period of 45 minutes, followed by further agitation for 2 hours. The mixture was then heated at 80° C. for 3 hours and at 95° C. for additional 3 hours to complete the suspension polymerization, and the resultantly obtained graft copolymer was filtered, washed with water and dried at 80° C. for 8 hours. The yield of the graft copolymer was 679 grams.

(B) Polymerization in Stage (II)

320 Grams of the graft copolymer obtained in (A), 1,730 grams of deionized water and 80 grams of a 5% aqueous solution of partially saponified polyvinyl alcohol (KH-20) were supplied into a 3-liter four-necked flask equipped with a stirrer, a thermometer, a reflux cooler and a nitrogen gas supply pipe, and after elevating the temperature to 60° to 65° C., this mixture system was further added with a mixture of 477 grams of styrene and 0.03 gram of t-butylcatechol under agitation. The graft copolymer in this mixed solution was ground into fine pieces and impregnated with the vinyl compounds in a convectional high mixer at 50° C. for 30 minutes. Then a mixed solution comprising 33 grams of styrene, 4.17 grams of lauroyl peroxide, 2.53 grams of benzoyl peroxide and 1.05 grams of tertiary dodecylmercaptan was added dropwise to this system under agitation and the mixture was allowed to stand at 55° C. for 30 minutes, followed by addition of 70 grams of a 5% aqueous solution of partially saponified polyvinyl alcohol (KH-20) and further feed of 190 grams of acrylonitrile. The system was then maintained at 55° C. for additional 30 minutes while introducing nitrogen gas and then further heated at 70° C. for 4 hours and at 95° C. for another 4 hours to complete the suspension polymerization. The produced resin was filtered, washed with water two to three times and then dried at 80° C. Yield was 980 grams.

The properties of the thermoplastic resins obtained in Examples 25 to 30 are shown in Table 6 below.

Table 6
Properties of thermoplastic resins obtained

| Example | Izod impact strength (using notched test pieces) (kg-cm/cm$^2$) | Tensile strength (kg/cm$^2$) | Thermal deformation temperature (°C.) |
|---|---|---|---|
| 25 | 7.1 | 483 | 83 |
| 26 | 11.0 | 404 | 79 |
| 27 | 8.5 | 459 | 82 |
| 28 | 12.0 | 435 | 81 |
| 29 | 11.5 | 448 | 82 |
| 30 | 12.3 | 493 | 80 |
| 31 | 31.1 | 480 | 78 |

Table 7 below shows the results of the weather resistance test conducted on the thermoplastic resin obtained in Example 26.

Table 7
Weather resistance of thermoplastic resin

| | Item Izod impact strength (kg-cm/cm$^2$) (using notchless test pieces) | | | |
|---|---|---|---|---|
| Irradiation time Example | 0 | 50 hrs | 100 hrs | 200 hrs |
| 26 | 86 | 75 | 56 | 30 |

Comparative Example 1

80 Grams of a 5% aqueous solution of partially saponified polyvinyl alcohol (KH-20), 115 grams of a 0.4% sodium polyacrylate aqueous solution, 1,630 grams of deionized water and 120 grams of EPDM rubber (EP-57C by Mitsubishi Petrochemical Co.) were supplied into a 3-liter four-necked separable flask attached with a stirrer, a thermometer and a reflux cooler, and this mixture was heated to 55° C. under agitation. Then a mixed solution consisting of 600 grams of styrene, 200 grams of acrylonitrile, 5.0 grams of benzoyl peroxide, 8.2 grams of lauroyl peroxide and 1.20 grams of tertiary dodecylmercaptan was added dropwise to the mixture system through the period of 1 hour, followed by further heating at 75° C. for 5 hours and then at 95° C. for 4 hours to complete the suspension polymerization. The produced resin was filtered, washed with water and dried at 80° C. for 8 hours.

Comparative Example 2

Polymerization was carried out in the same way as Comparative Example 1 except for use of 128 grams of a 5% aqueous solution of partially saponified polyvinyl alcohol (KH-20), 185 grams of a 0.4% sodium polyacrylate aqueous solution, 1,600 grams of deionized water, 200 grams of EPDM rubber (EP-57C by Mitsubishi Petrochemical Co.), 660 grams of styrene and 220 grams of acrylonitrile, consequently obtaining a thermoplastic resin.

Comparative Examples 3–6

(A) Polymerization in Stage (I)

480 Grams of a 5% aqueous solution of partially saponified polyvinyl alcohol (KH-20), 690 grams of a 0.4% sodium polyacrylate aqueous solution (Aron-Vis M) and 4,836 grams of deionized water were supplied into a 10-liter four-necked separable flask provided with a stirrer, a thermometer, a reflux cooler and a nitrogen gas feed pipe, and then 750 grams of EPDM rubber (EP-57C) was further supplied into the flask and the mixture was agitated. This mixed solution was heated to 50° C., and 562.5 grams of styrene, 187.5 grams of acrylonitrile and 14.06 grams of benzoyl peroxide were added dropwise through the period of about 45 minutes, followed by 2-hour agitation of the mixture. The mixture was then further heated at 80° C. for 3 hours and then at 95° C. for additional 3 hours to complete the suspension polymerization, and the resultantly obtained graft copolymer was filtered, washed with water and dried at 80° C. for 8 hours. The yield of the graft copolymer obtained was 1,490 grams.

(B) Blends

The specimens for Comparative Examples 3 to 6 were prepared by blending a styrene-acrylonitrile compolymer (Tyril 767 by Asahi Dow Co., Ltd.) in the graft copolymer obtained from the polymerization in the stage (I) such that the rubber content becomes 15%, 18%, 25% and 35%, respectively, and these blends were extruded into pellets by a kneading extruder.

The properties of the thermoplastic resins obtained in Comparative Examples 1 to 6 are shown in Table 8 below.

Table 8
Properties of thermoplastic resins

| Comparative Examples | Izod impact strength (using notched test pieces) (kg-cm/cm$^2$) | Tensile strength (kg/cm$^2$) | Thermal deformation temperature (°C.) |
|---|---|---|---|
| 1 | 1.8 | 467 | 80 |
| 2 | 2.5 | 428 | 78 |
| 3 | 2.4 | 453 | 80 |
| 4 | 3.3 | 430 | 77 |
| 5 | 2.5 | 412 | 75 |
| 6 | 3.9 | 391 | 72 |

The properties of the thermoplastic resins obtained in the respective Examples and Comparative Examples were determined in the following way.

The test pieces used were prepared by kneading:

| | |
|---|---|
| (1) thermoplastic resin | 100 grams |
| (2) Sumilizer-BBM (phenolic heat stabilizer produced by Sumitomo Kagaku Kogyo Co., Ltd.) | 0.1 gram |
| (3) Tinuvin-P (ultraviolet absorber produced by Ciba Geigy) | 0.1 gram |
| (4) Aroncizer-202 (alkyldiphenyl (plasticizer) produced by Shin Nippon Seitetsu Kagaku Co., Ltd.) | 0.5 gram |

Tensile strength was tested according to ASTM-D-256-56, impact strength according to ASTM-D-256 (Izod impact test using notched test pieces), thermal deformation temperature according to ASTM-D-648, and Rockwell hardness according to ASTM-D-785-51.

Flow characteristics were measured by using a Koka-type flow tester (mfd. by Shimazu Seisakujo Ltd.) (specimen: 1.5 grams; temperature: 200° C.; nozzle dimensions: 1 $\phi$ × 2 mm; load: 20 kg).

Weather resistance was determined by irradiating each specimen with the ultraviolet rays for a certain given period of time by using a sunshine weatherometer and then measuring notchless Izod impact strength according to ASTM-D-256.

What is claimed is:

1. A two-step process for producing high impact and weather resistant graft copolymers which comprises:

(I) in the first step, impregnating (A) 30 to 90% by weight of a substantially non-polar rubber-like polymer having an iodine value of from 2 to 40 and selected from the group consisting of ethylene-propylene type rubbers and butyl rubber with (B) 70 to 10% by weight of a vinyl compound mixture consisting of (B-1) 40 to 90% by weight of an aromatic vinyl compound, and (B-2) 60 to 10% by weight of a polar vinyl compound, and conducting bulk or suspension polymerization of the mixture obtained by the above-mentioned impregnation in the presence of (C) a polymerization initiator to produce a graft copolymer; and (II) in the second step, either dispersing with partly dissolving (D) the graft copolymer obtained in the step (I) in (E) a vinyl compound mixture consisting of (E-1) 40 to 90% by weight of an aromatic vinyl compound, and (E-2) 60 to 10% by weight of a polar vinyl compound or impregnating the component (D) with the component (E) and conducting bulk, suspension, or bulk-suspension polymerization of the mixture obtained by the above-mentioned dispersion or impregnation without using any organic solvent in the presence of (F) a polymerization initiator to produce the end product having 5 to 20% by weight of rubber component and 95 to 80% by weight of the total vinyl compounds, wherein the ratio of the aromatic vinyl compounds to the polar vinyl compounds is in the range of 60/40 to 90/10 by weight.

2. A process according to claim 1, wherein the component (A) is impregnated with the component (B) in the absence of water in the step (I).

3. A process according to claim 1, wherein, in the step (I), the component (A) is impregnated with the component (B) in the presence of water and the mixture is subjected to suspension polymerization in the presence of the component (C).

4. A process according to claim 1, wherein, in the step (I), the mixture obtained by grinding the component (A) in the presence of water by a crusher while or after impregnating the component (A) with the component (B) is subjected to suspension polymerization in the presence of the component (C).

5. A process according to claim 4, wherein the crusher is a convectional high mixer.

6. A process according to claim 1, wherein, in the step (II), the mixture obtained by dispersing with partly dissolving the component (D) in the component (E) is subjected to bulk, suspension or bulk-suspension polymerization in the presence of the component (F).

7. A process according to claim 6, wherein said dispersion with partial solution of the component (D) in the component (E) is accomplished by first dissolving the component (D) in a vinyl compound mixture consisting of 100 to 85% by weight of an aromatic vinyl compound and 0 to 15% by weight of a polar vinyl compound, and then adding the remaining vinyl compounds to the solution.

8. A process according to claim 6, wherein said mixture is subjected to suspension polymerization.

9. A process according to claim 6, wherein said mixture is subjected to bulk-suspension polymerization.

10. A process according to claim 6, wherein said mixture is subjected to bulk polymerization.

11. A process according to claim 1, wherein, in the step (II), the mixture obtained by impregnating the component (D) with the component (E) is subjected to suspension polymerization in the presence of the component (F).

12. A process according to claim 11, wherein the component (D) is impregnated with the component (E) in the absence of water in the step (II).

13. A process according to claim 11, wherein, in the step (II), the component (D) is first ground by a crusher and then impregnated with the component (E).

14. A process according to claim 11, wherein, in the step (II), the component (D) is impregnated with the component (E) under agitation in the presence of water in an amount of 50% by weight or more based on the total weight of said both components (D) and (E).

15. A process according to claim 11, wherein, in the step (II), the mixture obtained by grinding the component (D) by a crusher, while or after impregnating the component (D) with the component (E), in the presence of water in an amount of 50% by weight or more based on the total weight of said both components and is subjected to suspension polymerization in the presence of the component (F).

16. A process according to claim 15, wherein the crusher is a convectional high mixer.

17. A process according to claim 1, wherein in the step (I), the mixture obtained by impregnating the component (A) with the component (B) in the presence of water is subjected to suspension polymerization in the presence of the component (C), and then in the step (II), the mixture obtained by first dissolving the component (D) in a vinyl compound mixture consisting of 100 to 85% by weight of an aromatic vinyl compound and 0 to 15% by weight of a polar vinyl compound and then adding the remaining vinyl compounds is subjected to suspension polymerization in the presence of the component (F).

18. A process according to claim 1, wherein in the step (I), the mixture obtained by impregnating the component (A) with the component (B) in the presence of water is subjected to suspension polymerization in the presence of the component (C), and then in the step (II), the mixture obtained by grinding the component (D) by a convectional high mixer while or immediately after impregnating the component (D) with the component (E) under agitation in the presence of water in an amount of 50% by weight or more based on the total weight of said both components (D) and (E) is subjected to suspension polymerization in the presence of the component (F).

19. A process according to claim 1, wherein the graft copolymer obtained in the step (II) is loaded with 8 to 20% by weight of the rubber-like polymer.

20. A process according to claim 1, wherein the graft copolymer obtained in the step (I) is loaded with 40 to 70% by weight of the rubber-like polymer.

21. A process according to claim 1, wherein the aromatic vinyl compound/polar vinyl compound weight ratio in the graft copolymer obtained in the step (II) is in the range of 60/40 to 80/20.

22. A process according to claim 1, wherein the substantially non-polar rubber-like polymer with iodine value of 2 to 40 is an ethylene-propylene copolymer rubber or ethylene-propylene-non-conjugated-diene terpolymer rubber.

23. A process according to claim 22, wherein the ethylene-propylene-non-conjugated-diene terpolymer rubber has Mooney viscosity $ML_{1+4}$ (100° C.) of 60 to 90.

24. A process according to claim 23, wherein the ethylene-propylene-non-conjugated-diene terpolymer rubber is an ethylene-propylene-5-ethylidene-2-norbornene terpolymer rubber.

25. A process according to claim 1, wherein the aromatic vinyl compounds of the components (B) and (E) are styrene and/or α-methylstyrene.

26. A process according to claim 1, wherein the polar vinyl compounds of the components (B) and (E) are acrylonitrile and/or methyl methacrylate.

27. A process according to claim 1, wherein the rubber-like polymer (component (A)) is an ethylene-propylene-5-ethylidene-2-norbonrnene terpolymer rubber, and the aromatic vinyl compound of the components (B) and (E) is styrene and the polar vinyl compounds of the components (B) and (E) are acrylonitrile, or acrylonitrile and methyl methacrylate.

* * * * *